United States Patent [19]

Cash et al.

[11] Patent Number: 5,481,297

[45] Date of Patent: Jan. 2, 1996

[54] MULTIPOINT DIGITAL VIDEO COMMUNICATION SYSTEM

[75] Inventors: Glenn L. Cash, Matawan; Mehmet R. Civanlar, Red Bank; Robert D. Gaglianello, Little Silver; Donald B. Swicker, Wall, all of N.J.

[73] Assignee: AT&T Corp., Murray Hill, N.J.

[21] Appl. No.: 201,871

[22] Filed: Feb. 25, 1994

[51] Int. Cl.⁶ ........................................ H04N 7/24
[52] U.S. Cl. ........................ 348/13; 348/385; 348/398
[58] Field of Search ........................... 348/385, 398, 348/409, 13, 387, 392; H04N 7/13, 7/12, 7/24

[56] References Cited

U.S. PATENT DOCUMENTS 5,235,420  8/1993  Gharvi ................................. 348/398
5,260,783  11/1993  Dixit ................................... 348/409

OTHER PUBLICATIONS

Kandlur, Dilip D., "MMT System Architecture," High Bandwidth Applications, IBM T. J. Watson Research Center, Proceedings of the Second Packet Video Workshop, vol. 1, Dec. 9–10, 1992, pp. 1–9.

Santo, Brian, "IBM Videoconferencing For Less," Electronic Engineering, Nov. 9, 1992.

Information Technology—Generic Coding of Moving Pictures and Associated Audio, Recommendation H.262, ISO/IEC 13818-2, Nov. 1993, Seoul.

*Primary Examiner*—Howard W. Britton

[57] ABSTRACT

The described video communication system incorporates multiple window display. One or more video transmission nodes provide macroblocks of video data available in a plurality of resolution levels. The transmission node encodes the macroblocks and assigns macroblock identifiers (IDs) to each macroblock. A receiving node receives a plurality of video sequences from a plurality of transmission nodes through a communication network. The receiving node thereafter eliminates macroblocks of video data that will not be displayed, such as in the case of portions of video that are hidden or overlapped. A macroblock translator also transforms the macroblock ID to a new macroblock ID which reflects the macroblock's position on the display screen as dictated by the user's window configuration. A decoder thereafter decompresses the video data one macroblock at a time, and provides the decompressed macroblock to a frame buffer. The frame buffer provides the window configured video data to a display.

36 Claims, 6 Drawing Sheets

MULTIPOINT DIGITAL VIDEO COMMUNICATION SYSTEM

FIELD OF THE INVENTION

The present invention relates to the field of digital video processing and transmission, and particularly to multiple window digital video reception and display.

BACKGROUND OF THE INVENTION

The acceptance of digital video compression standards, for example, the Motion Picture Expert Group (MPEG) standard, combined with the availability of a high-bandwidth communication infrastructure have poised the telecommunications market for an explosion of video based services. Services such as video-on-demand, multi-party interactive video games, and video teleconferencing are actively being developed. These and other future video services will require a cost-effective video composition and display technique.

An efficient multiple window display is desirable for displaying the multiple video sequences produced by these applications to a video user or consumer. The implementation of such a windows environment would permit a user to view simultaneously several video sequences or images from several sources. The realization of a commercial multiple window video display is hampered by technological limitations on available data compression equipment.

In digital television and other digital image transmission applications, image signals must be compressed or coded to reduce the amount of bandwidth required for transmission. Typically, a full screen frame of video may be composed of an array of at least 640×480 picture elements, or pixels, each pixel having data for luminance and chrominance. Under one standard, for example, the frames are composed of 720×480 pixel arrays. A video sequence is composed of a series of such discrete video frames, similar to the frames in a moving picture film. True entertainment quality video requires a frame rate of at least thirty frames per second. Uncompressed, the bit rate required to transmit thirty frames per second would require far more bandwidth than presently practical.

Image coding techniques serve to compress the video data in order to reduce the number of bits transmitted per frame. There are several standard image coding techniques, each of which take advantage of pixel image data repetition, also called spatial correlation.

Spatial correlation occurs when several adjacent pixels have the same or similar luminance (brightness) and chrominance (color) values. Consider, for example, a frame of video containing the image of a blue sky. The many pixels comprising the blue sky image will likely have identical or near identical image data. Data compression techniques can exploit such repetition by, for example, transmitting the luminance and chrominance data for one pixel and transmitting information on the number of following pixels for which the data is identical, or transmitting only the difference between adjacent pixels. Presently, spatial correlation is exploited by compression techniques using discrete cosine transform and quantization techniques. Where such data compression or coding is employed, each video source or transmission node must be equipped with data encoding equipment and each receiving node must likewise be equipped with decoding equipment. Several video coding protocols are well-known in the art, including JPEG, MPEG1, MPEG2 and Px64 standards.

In a multipoint video application, such as a video teleconference, a plurality of video sequences from a plurality of sources are displayed simultaneously on a video screen at a receiving node. Multiple window video display currently requires the use of multiple decoding devices. Otherwise, the video data arriving from multiple sources would often overload the capacity of a single decoding device. Furthermore, currently available decoding devices are not equipped to handle simultaneously video sequences from disparate sources. Decoding circuitry relies on video sequence context information which emanates from the source of the video. Current decoding devices cannot store, access and switch between several video sequence contexts as would be necessary to contemporaneously decode video from several sources.

The disadvantage of the prior art, therefore, is the requirement of multiple decoding devices. At present, the decoder chips and chip sets, even relatively simple ones, such as those compatible with the JPEG and Px64 technologies, are expensive. As a consequence, the use of multiple decoding devices provides an impractical windowing solution.

A further difficulty encountered in multiple window video is that many sources provide video in only one screen display size. In fact, many sources transmit only full screen images which typically comprise 640×480 pixels per frame. To provide truly flexible windowing capabilities, different users should have the option of invoking and viewing differently sized windows of the same video. Windows which comprise a fraction of the entire display require the image data to be filtered and subsampled, resulting in frame signals comprising less pixels. For example, a ¼ screen window, requires frame data comprising only 320× 240 pixels. It is therefore advantageous to make video data available at a plurality of window sizes or resolution levels. For example, the video of a participant in a teleconference may be made available at full screen resolution, ¼ screen, $1/16$ screen or $1/64$ screen, so that the other participants can choose a desired size window in which to view the transmitting participant.

Under one technique of providing multiple resolution levels, each video transmitter provides a plurality of video sequences, each independently containing the data signal for a particular resolution level of the same video image. One method of generating multiple resolution video sequences would be to employ several encoders, one for each resolution level. The requirement of multiple encoders, however, as in the case of decoders, increases system cost. Encoders comprise extremely costly components in digital video transmission systems.

SUMMARY OF INVENTION

The present invention provides a method and system for encoding, transmitting, receiving, decoding and displaying a plurality of video sequences available at a plurality of resolution levels while minimizing the requirements for encoding and decoding circuitry.

According to the present invention, one or more video transmission nodes provide macroblocks of video data available in a plurality of resolution levels. The transmission node encodes the macroblocks and assigns macroblock identifiers (IDs) to each macroblock. A receiving node receives a plurality of video sequences from a plurality of transmission nodes through a communication network. The receiving node operating according to the present invention thereafter eliminates macroblocks of video data that will not be displayed, such as in the case of portions of video that are hidden or overlapped. A macroblock translator also transforms the macroblock ID to a new macroblock ID which reflects the macroblock's position on the display screen as dictated by the user's window configuration. A decoder thereafter decompresses the video data one macroblock at a time, and provides the decompressed macroblock to a frame buffer.

The macroblock elimination and macroblock translation steps may be executed either at the receiving node or at a bridge connected to the communication network. The present invention may provide the above described functionality in a variety of standard video compression environments, including JPEG, MPEG1, MPEG2 and Px64. Alternative embodiments of the present invention support intraframe, interframe, and motion compensated video compression.

The above discussed features, as well as additional features and advantages of the present invention, will become more readily apparent by reference to the following detailed description and the accompanying drawings.

DETAILED DESCRIPTION OF THE DRAWINGS

Figure 1:
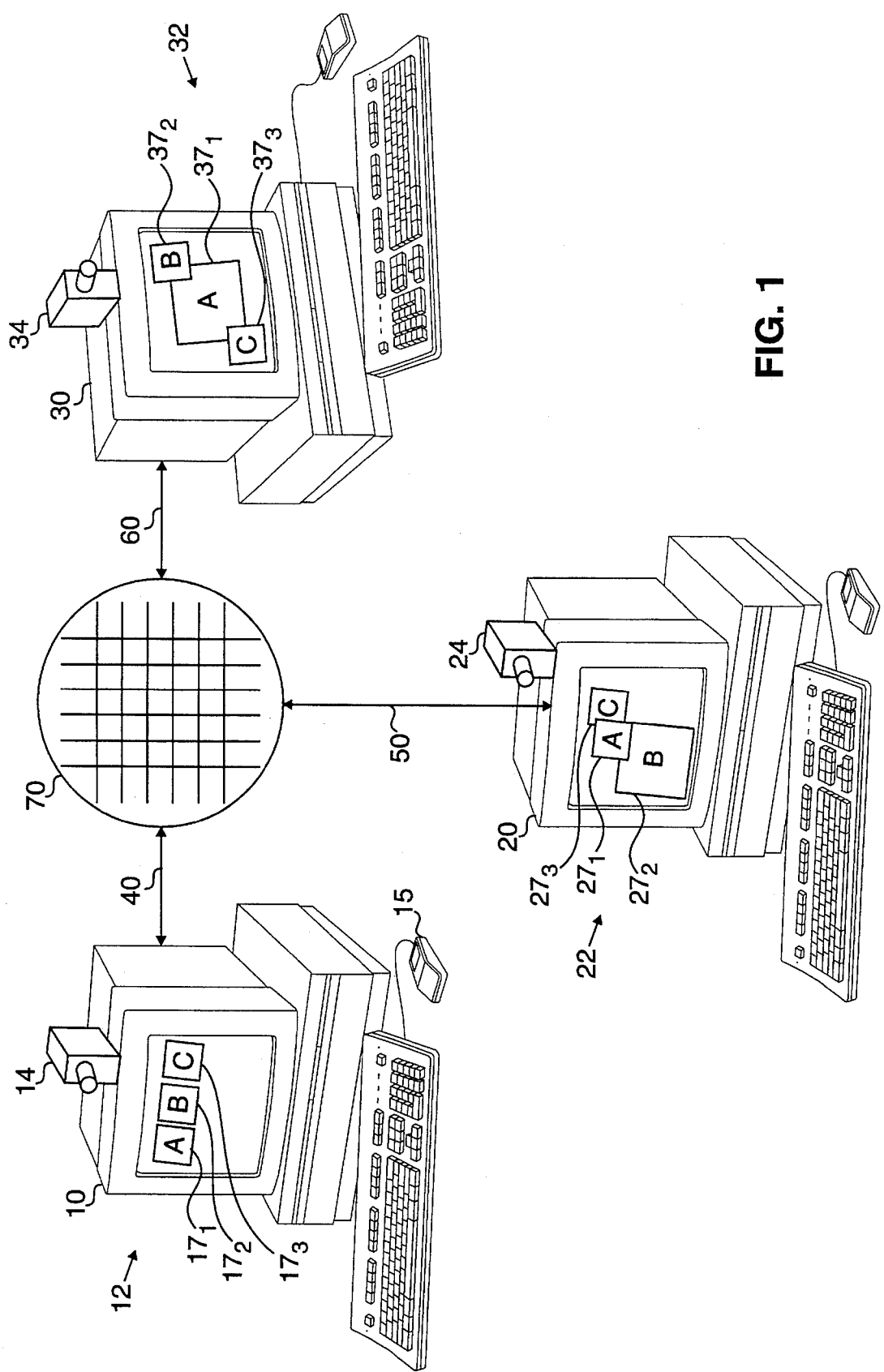
FIG. 1 illustrates an example of a video teleconferencing system which may be utilized in conjunction with method of the present invention.

FIG. 1 illustrates an example of a multipoint video system suitable for use in conjunction with the methods of the present invention. While the exemplary system in FIG. 1 shows a three participant video teleconferencing system, any number of participants that will reasonably fit on a video display screen are possible using the present invention. Likewise, other sources of digital video may replace one or more of the participants, such as a digital chalkboard or video laser disk.

Three nodes 12, 22 and 32 are connected through communication lines 40, 50 and 60, respectively, to a network 70. The node 12 comprises a work station including a video display 10 and a video camera 14. A mouse 15 or similar input device is connected to the video display 10. Display windows $17_1$, $17_2$ and $17_3$ appear on the video display 10. Nodes 22 and 32 also comprise work stations and include similar video displays 20 and 30 and similar video cameras 24 and 34, respectively. Display windows $27_1$, $27_2$ and $27_3$ appear on video display 20 and the display windows $37_1$, $37_2$ and $37_3$ appear on video display 30.

Each of the work stations 12, 22 and 32 operates as both a video transmission node and a video receiving node, in other words, they both provide video to and receive video from the other nodes. The video cameras 14, 24 and 34 provide video signals for transmission and the video displays 10, 20 and 30 receive and display video signals. To this end, each work station 12, 22 and 32 includes a multipoint encoder circuit, not shown, which enables transmission of digital video data to a plurality of nodes, and a multipoint decoder circuit, not shown, which enables simultaneous reception and display of digital video signals from a plurality of nodes. According to the present invention, one or more of the work stations 12, 22 and 32 may be equipped with a multipoint encoder circuit similar to the one described in connection with FIG. 2 below. Furthermore, at least one of the work stations may be equipped with a multipoint decoder circuit similar to the one described in connection with FIGS. 3 and 4, below.

In the example illustrated in FIG. 1, user A, user B and user C establish and participate in a video teleconference. Users A, B and C are located at work stations 12, 22 and 32 respectively. In operation, work stations 12, 22 and 32 establish intercommunication by connecting through communication lines 40, 50 and 60 to the broadband network 70. The network 70 may comprise any suitable data communications infrastructure, such as a local area network, wide area network, PBX or digital cable TV system.

Each user then transmits a digital video signal comprising a plurality of video sequences, each containing a different resolution level of the image captured by cameras 14, 24 and 34 to the network 70. For example, user A provides a camera image of his upper torso and face at full screen (640×480 pixels), ¼ screen (320×240 pixels), ¹⁄₁₆ screen (160×120 pixels) and ¹⁄₆₄ (80×60 pixels) screen resolution. Because of the manner in which video data is segmented, which will be discussed further below, the ¹⁄₆₄ screen resolution may actually comprise either 80× 56 or 80×64 pixels. User B and user C may provide like video sequence signals of their video images.

Users A, B and C then select a display preference by choosing the size and placement of windows in which the video from each participant, A, B and C will be viewed. For example, user A may, for example, select the window illustrated by window $17_1$ to view his own video signal, window $17_2$ to view user B's video signal, and window $17_3$ to view user C's video signal. User B and user C likewise select windows independent of user A and each other. As a consequence, while user A selects to a ¹⁄₁₆ screen image of each participant, user B selects to view ¼ screen of herself, and a ¹⁄₁₆ screen image of both user A and user C. User C selects yet a different configuration.

Once the selections are made, each work station 12, 22 and 32 establishes a virtual circuit connection to receive the selected video signals of each participant over the network 70. For example, user A establishes a connection to receive the ¹⁄₁₆ resolution video data transmission of both B and C, while user B establishes a connection with the ¹⁄₁₆ video sequence of user A and the ¼ video sequence of user B. In the example discussed above, the full screen resolution data sequence from all the users is not requested by any participants and therefore is not transmitted over the network. This reduces the number of transmitted bits, and consequently reduces the load on the network.

As stated above, each of the nodes 12, 22 and 32 provides a digital signal comprising a plurality of resolution level video sequences to the network 70. A suitable multipoint encoder circuit which is operable to produce the plurality of video sequence digital signals from an analog video input is illustrated below in connection with FIG. 2.

A multipoint encoder circuit 200 capable of producing up to four sequences of video data representing four different resolutions of video receives a National Television Systems Committee (NTSC) analog video signal on input line 202. The source of the signal may suitably be one of the video cameras 14, 24 or 34 from FIG. 1, or other analog television raster signal source. The multipoint encoder circuit 200 operates in accordance with the MPEG2 video compression standard, but may readily be adapted to any other suitable standard by one of ordinary skill in the art.

The NTSC input line 202 is connected to an A/D converter 204. The A/D converter 204 may suitably be an analog to digital signal conversion device capable of digitizing a 525 line NTSC analog signal into a digital signal of 640×480 pixels. Devices with such capabilities are readily available. The A/D converter 204 is connected to a first anti-aliasing filter 208 and a third strip memory 220.

The first anti-aliasing filter 208 is coupled to both a second anti-aliasing filter 212 and a first strip memory 216. The second anti-aliasing filter 212 is further coupled to a second strip memory 218. Each of the first and second anti-aliasing filters 208 and 212 comprises a low-pass digital filter.

A controller 224 is operably connected to write control pins or connections of each of the first, second and third strip memories 216, 218 and 220. The controller is programmed to effect subsampling by selectively triggering the write control on each memory 216, 218 and 220. The selective triggering allows only certain intervals of data to be written therein. The controller 224 may suitably comprise a microprocessor or sequence controller, the programming of which would be apparent to one of ordinary skill in the art. The controller 224 is further operably connected to a control connection of a multiplexer 228. The multiplexer 228 may comprise any suitable time division multiplexing device.

The strip memories 216, 218 and 220 are operably coupled to the multiplexer 228. The multiplexer 228 is thereafter connected to an encoding device 240. The encoding device 240 may suitably comprise a video data encoding chip or chip set which encodes data according to the MPEG2 standard. The encoding device 240 will be further coupled to an reference frame store 232 to enable interframe coding. The controller 224 is also connected to the reference frame store 232. Encoding devices using only intraframe coding, such as JPEG, need not include the reference frame store 232.

The encoding device 240 is coupled to a buffer 244. The buffer 244 output connection is coupled to a packetizer 248. The buffer 244 and packetizer 248 are both connected to the controller 224.

The encoder circuit 200 described above operates in the following manner to provide multiple video sequences, each providing a distinct resolution of the same video image.

A source of video, not shown, provides NTSC video signal to the A/D converter 204. The A/D converter 204 samples the signal at 640 samples per line. While NTSC signals comprise a 525 line video signal, only approximately 480 lines contain relevant video information. As a result, the A/D converter 204 may create a 640×480 digital representation of the video signal. Each sample comprises video data for a picture element or pixel. Each pixel may be considered as having an address of (x,y) where x=0 through 639 and y=0 through 479.

It should be noted that NTSC signals do not provide the 480 visible lines sequentially. Instead, the signal is divided into two fields, each containing the information for every other line. In other words, one field contains all the even numbered lines and the other field contains all the odd numbered lines. One field is transmitted in its entirety before the other field is transmitted. Because the A/D converter 204 digitizes the NTSC signal as it is received, the resulting digital signal is likewise divided into two fields.

The A/D converter 204 provides the full 640×480 resolution video sequence bit stream to both the first anti-aliasing filter 208 and the third strip memory 220. The filter 208 functions as a digital low pass filter and removes high frequency components that could otherwise corrupt a 2 to 1 subsampling operation. The filtered digital signal is then provided to the first strip memory 216. The controller 224, however, by selectively providing write enable signals, only allows every other pixel to be written to the strip memory 216. The strip memory 216 will therefore only hold 320×480 pixels of video data. Moreover, because the data is provided in two fields, the strip memory will contain, in sequential order, two fields of 320×240 pixels of video data, one with the odd rows and one with the even rows. Either one of these fields alone comprises a ¼ screen resolution frame of a video sequence. As a consequence, the field structure of the frame signal inherently subsamples the frame vertically at a 2 to 1 rate.

The A/D converter 204 also provides the full 640×480 frame signal to the third strip memory 220 to allow for a full screen resolution transmission. The two fields of video data must of course be interleaved prior to display to build an entire frame. This task, however, is accomplished at each receiving node, such as work station 12, 22 or 32 of FIG. 1.

Returning to the first anti-aliasing filter 208, the filter 208 also provides the filtered digital signal to another anti-aliasing filter 212. The second filter 212 further filters the signal already filtered by the first filter 208 to allow for higher order subsampling, namely 4 to 1 and 8 to 1.

The second anti-aliasing filter 212 provides the doubly filtered digital signal to the second strip memory 218. The controller 224 provides write enable signals to the second strip memory 218 to effect subsampling of the filtered signal. The controller 224 effects 4 to 1 subsampling of the first field and 8 to 1 subsampling of the second field. The controller 224 accomplishes the subsampling by allowing every fourth pixel to be written for the first field of each frame and every eighth pixel to be written for the second field of each frame.

The controller 224 additionally achieves vertical subsampling by eliminating every other line in the first field and 3 out of every 4 lines for the second field. As a result, the second strip memory 218 will contain a 160×120 pixel representation of the image (the first field) and 80×60 pixel representation of the image (the second field). Other suitable mechanisms for vertical and horizontal subsampling may be implemented and will be apparent to those of ordinary skill in the art.

The first, second and third strip memories 216, 218 and 220, therefore, contain full screen, ¼ screen, ⅟₁₆ screen and ⅟₆₄ screen digital frame data. The memories 216, 218 and 220 provide data in the form of blocks called macroblocks or slices to the multiplexer 228. Macroblocks are blocks of pixels, typically a 16×8 or 16×16 pixel array, which together constitute an entire frame of video data. One or more macroblocks comprise a slice, which are used in MPEG-based systems. Slices and macroblocks are processed in the same manner. For purposes of simplicity, generic term macroblock will be employed to describe either macroblocks or slices.

In typical video signal applications, macroblocks are transmitted sequentially from left to right, top to bottom. Thus, for example, 2400 16×8 macroblocks would constitute an entire 640×480 pixel frame of a video sequence.

The macroblocks at the multiplexer 228 constitute four independent video sequences, each containing the original video sequence at a different resolution level. The multiplexer 228, under the control of the controller 224, provides a single stream of time-division multiplexed macroblocks of all four resolutions to the encoding device 240. The encoding device encodes or compresses each macroblock individually. Because MPEG-based compression systems employ interframe coding, the encoder 240 will receive reference frame information from the reference frame store 232. In interframe coding applications, the encoder relies on information from previous (and in some cases future) frames to encode a particular frame. The use of the reference frame store 232 to provide the previous (or future) frame data to the encoder is well-known in the art. According to the present invention, however, the reference frame store 232 must provide reference frame information for a plurality of video sequences, in other words, each resolution.

The reference frame store 232 must therefore contain reference frame information for all four resolution level video sequences. The controller 224 directs the encoding device 240 to the proper reference frame by bank-switching the reference frame store 232. For example, if the current macroblock entering the encoding device is from the ¼ resolution video sequence, the controller directs the encoding device 240 to the ¼ resolution reference frame stored within the reference frame store 232. If the next macroblock is from the ⅟₆₄ resolution video sequence, the controller appropriately redirects the encoding device 240.

Figure 2:
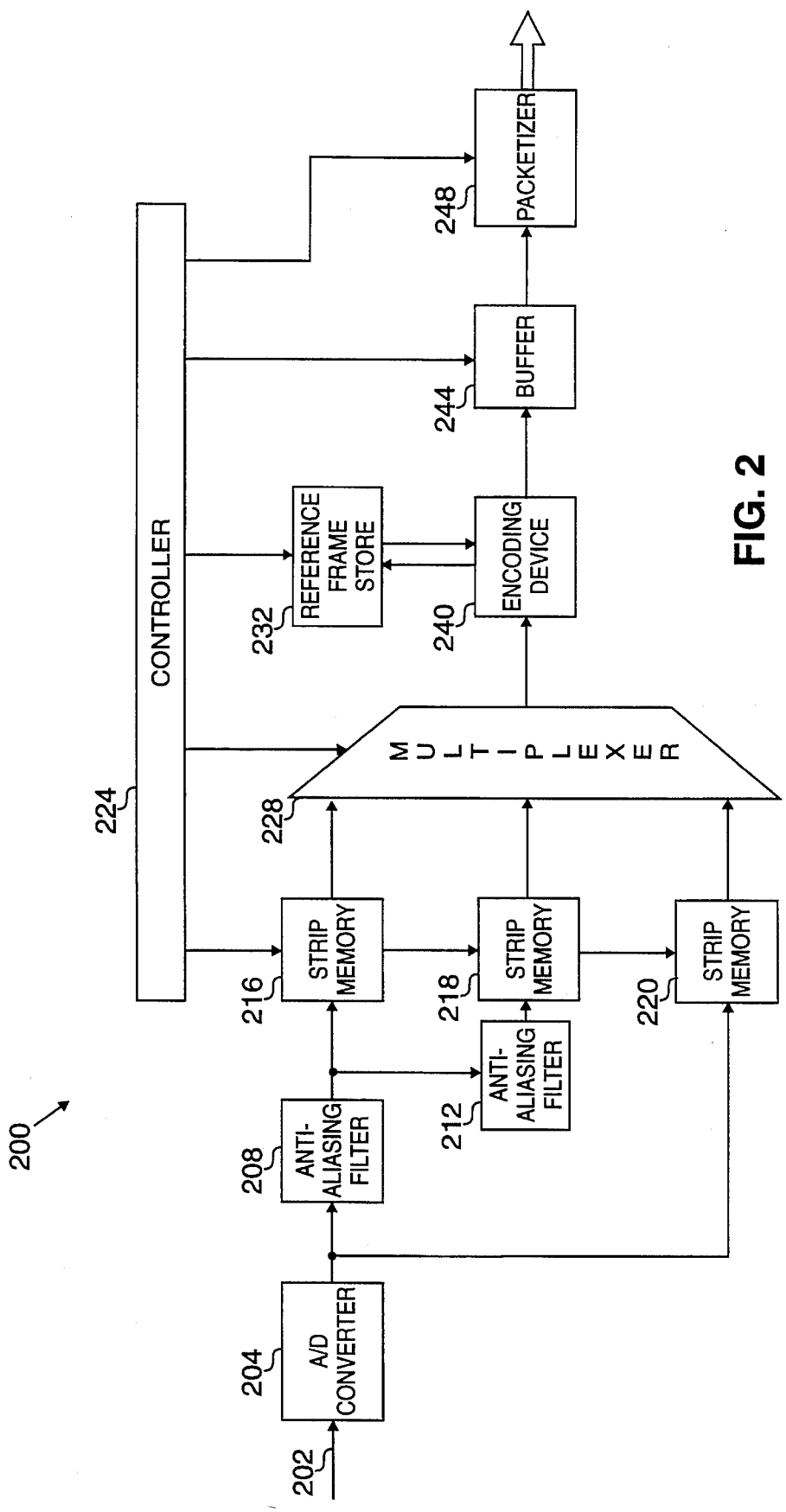
FIG. 2 illustrates a multipoint encoder circuit operable to transmit compressed video data in four different resolution levels from a single input video sequence without introducing appreciable delay according to one aspect of the present invention.

The encoding device 240 as described encodes or compresses data for all four resolution video sequences when configured as shown in FIG. 2 and described herein. The encoder must, therefore, for every video frame received at input 202, encode data corresponding to one full screen frame plus data for ¼ frame, ⅟₁₆ frame and ⅟₆₄ frame. It should be noted, however, that the amount of data encoded per frame is not extensively increased, and thus the does not introduce appreciable delay or unduly tax the capabilities of currently available encoding devices.

The encoding device 240 further adds macroblock identifiers (IDs) to each macroblock. The macroblock ID comprises data representative of the macroblock's position in a frame of its video sequence. Macroblock IDs are typically assigned sequentially left to right, top to bottom in each frame. The macroblock IDs are specific to each video sequence. Therefore, the full screen resolution video sequence will have macroblock IDs numbering from 0 to 2399 while the ¼ screen resolution sequence will have its own macroblock IDs numbering from 0 to 599 and so on.

The encoding device 240 provides the time-division multiplexed, compressed macroblocks, now comprising video data and their macroblock IDs, to a buffer 244. The controller 224 then controllably directs the buffer 244 to write macroblocks to the packetizer 248.

It should be noted that in some compression standards, such as the JPEG standard, macroblock IDs are not utilized. In such a circumstance, the controller 224 may simply create and write the macroblock IDs to the compressed macroblocks at the packetizer. Such an adaptation would be readily implemented by one of ordinary skill in the art.

While the above encoder circuit 200 may be employed to transmit video signals from a node such as work station 12 of FIG. 1, a multipoint decoder circuit is required to receive digital video signals from several sources. Multipoint decoder circuit 400 described below and illustrated in FIG. 3 may be incorporated by work station 12 of FIG. 1 to enable reception of multiple digital video sequences.

Figure 3:
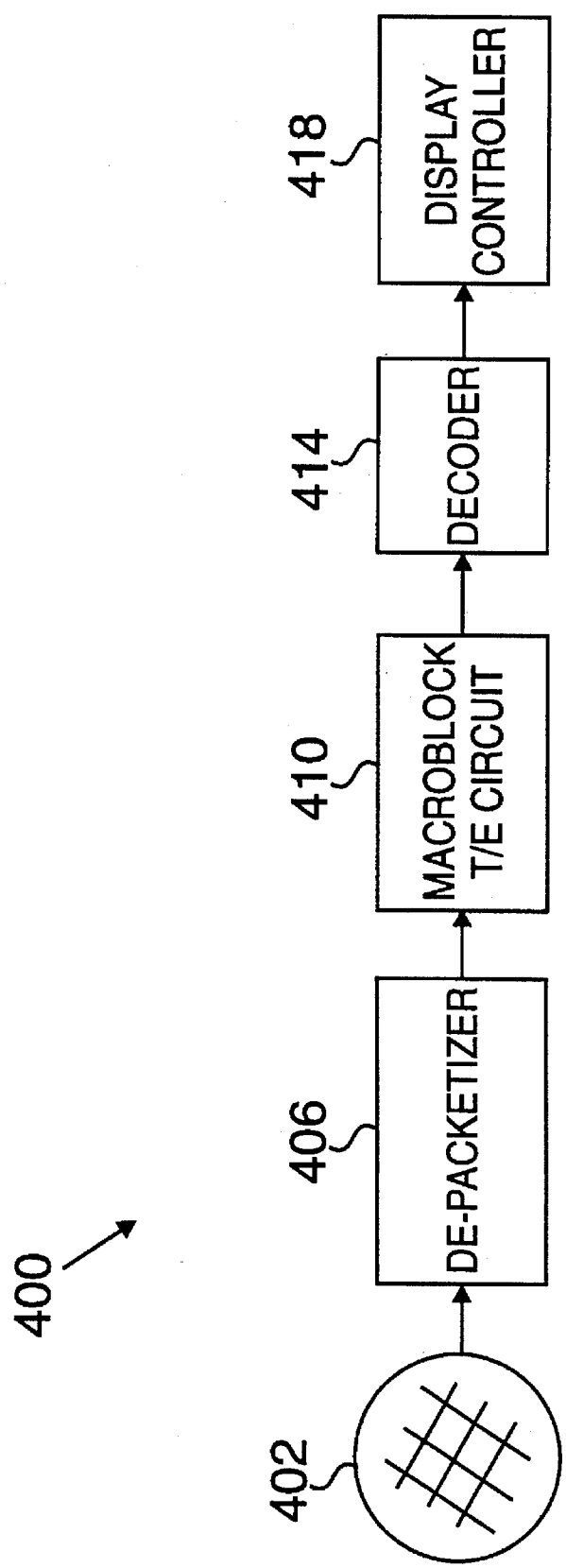
FIG. 3 illustrates a functional block diagram of a multipoint decoder circuit which is capable of receiving, decoding and displaying video data from a plurality of sources simultaneously using the method of the present invention.

Referring now to FIG. 3, the multipoint decoding circuit 400 illustrated therein employs a novel multipoint decoding method in accordance with one aspect of the present invention. The circuit 400 as described below is compatible with systems using interframe encoded MPEG2 data with the motion compensation functionality suppressed. Other suitable interframe compression techniques may similarly be employed.

The circuit 400 illustrated in FIG. 3 receives, decodes and displays a plurality of video sequences provided through a network 402 as data packet stream. A depacketizer 406 receives from the network 402 packet data for a plurality of video sequences containing, for example, the three video images of users A, B and C from FIG. 1. The depacketizer 406 provides three compressed video data streams corresponding to the three video sequences to a macroblock translation and elimination (T/E) circuit 410. The macroblock T/E circuit 410 both eliminates macroblocks of video data that will not be displayed and translates the position of the macroblocks data to match the user's configuration. Macroblock elimination is required because in a windows environment, certain portions of video window may overlap portions of another window. As a result, if a given macroblock is contained within the portion of a window that is hidden from view or occluded, the macroblock T/E circuit 410 eliminates that macroblock data.

The macroblock T/E circuit 410 thereafter translates each macroblock's positional information to match the user-defined windows, such as windows $17_1$, $17_2$ and $17_3$. To provide a versatile, user-definable windows environment the macroblock position must be converted to conform to the receiving user's window configuration. The T/E circuit 410 serves to direct the macroblocks received to the proper portion of the screen. When a video sequence is transmitted by an encoder such as the one illustrated in FIG. 2, each macroblock contains a macroblock ID defining its position on the screen relative to other macroblocks in the video sequence. Macroblock IDs are ordinarily employed by receiving nodes to place the macroblock within the display screen. The macroblock ID is therefore translated to a new macroblock ID reflecting its user-defined display screen position.

If the system receives macroblock video data without macroblock IDs, the packetizer 406 in conjunction with the control circuitry may add the video sequence or source macroblock ID by reference to the macroblock's incoming sequence, as long as the macroblock IDs are received sequentially with respect to each video sequence. In other words, each macroblock from each source is simply assigned its sequence number with a frame of a video sequence as it is received by the packetizer 406.

The T/E circuit 410 thereafter provides the partially occluded and translated video sequences, one macroblock at a time, to a decoding device 414. The macroblocks from each of three video sequences are intermixed randomly within the bit stream. The partially occluded bit stream includes only the data for the visible portion of the display.

One important feature of the present invention is that the T/E circuit 410 eliminates invisible video data prior to decoding or decompression. By eliminating occluded macroblocks prior to decoding, the decoder 414 performs the decoding function on the same or lesser quantity of data for several windows as it would for one full screen. According to the present invention, therefore, a single decoder may support any number of windows without overtaxing its processing capabilities. Further details regarding the T/E circuit 410, used in conjunction with the decoding device 414, are discussed below in connection with FIG. 4.

The decoding device 414 thereafter decompresses or decodes the macroblocks suitable for storage and eventual display by the display controller 418, producing a stream comprising three video sequences of macroblocks. Any suitable decoder, including JPEG, MPEG1, MPEG2 or Px64 type decoders may be configured according to the present invention to perform the functions of the decoder 414.

The decoding device 414 must, however, be configured to be context switchable. In normal operation, a decoding device relies on certain overhead information generally provided in the transmission of each video sequence. As a result, the decoder must be configured to switch overhead parameters to correspond with the context of each video sequence being decoded. The decoder 414 thereby has the ability to receive and decode a plurality of incoming video sequences from unrelated sources. A detailed discussion of the T/E circuit 410 and the context-switchable decoder circuit 414 is provided below.

Figure 4:
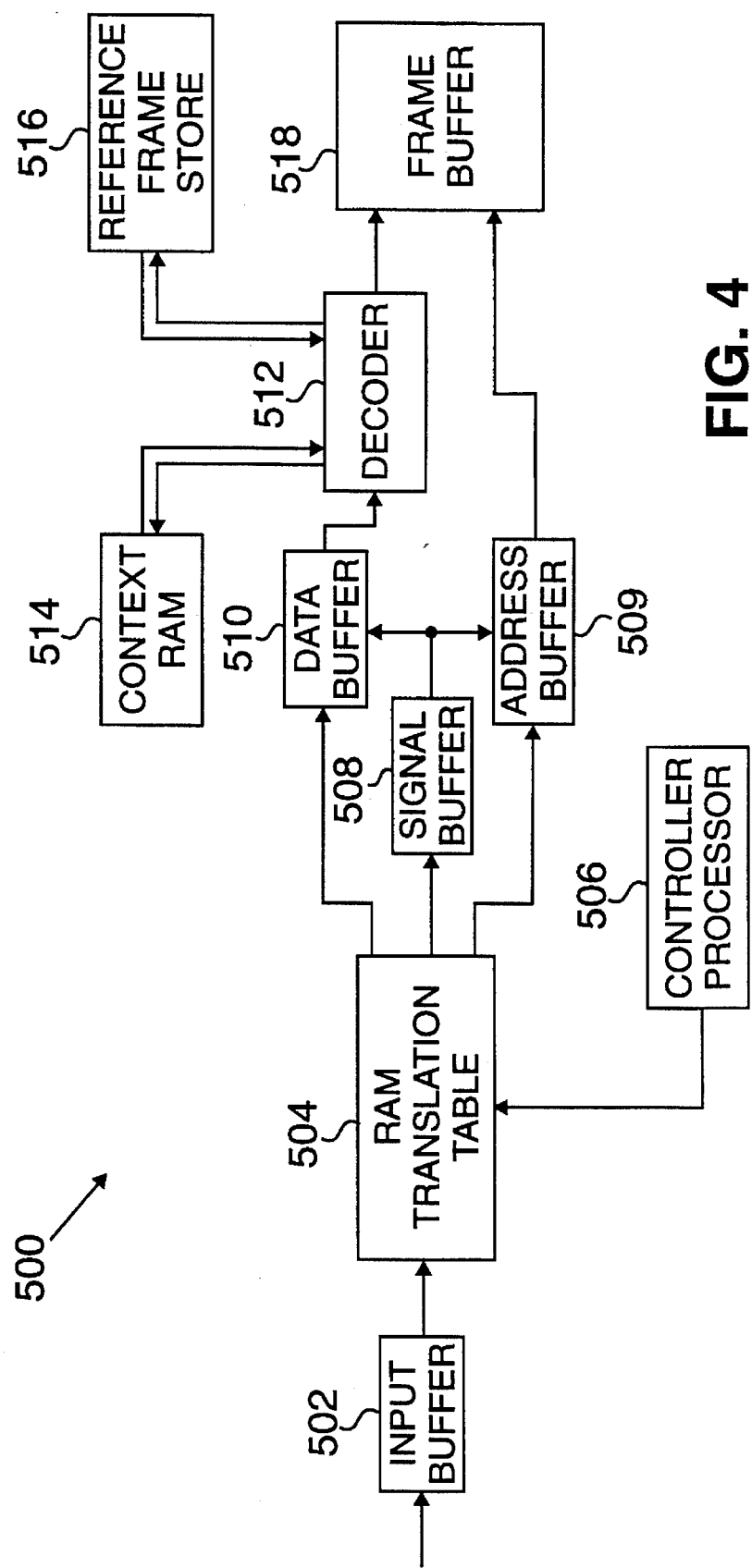
FIG. 4 illustrates a detailed block diagram of a macroblock translator and eliminator, a decoder and related circuitry which are capable of practicing one aspect of the present invention in order to enable multiple window display of a plurality of video images corresponding to a plurality of compressed data streams.

FIG. 4 illustrates a circuit 500 comprising a detailed embodiment of the T/E circuit 410 and decoder circuit 414 discussed above in connection with FIG. 3. An input buffer 502 is connected to a RAM-based translation table 504. A control processor 506 is operably connected to the RAM-based translation table 504.

The RAM-based translation table 504 is in turn connected to a translated address buffer 509. The RAM-based translation table 504 is further connected to a macroblock data buffer 510 for providing compressed video data without a macroblock ID address thereto. The buffers 509 and 510 may suitably comprise first in first out (FIFO) buffers containing write control pins or connections.

The RAM-based table 504 is further connected to a write control signal buffer 508. The write control signal buffer 508 is further connected to the write control pins or connections of both the translated address buffer 509 and the macroblock data buffer 510. The translated address buffer 509 is coupled to a frame buffer 518.

The macroblock data buffer 510 is coupled to a decoding device 512. The decoding device 512 is a chip or chip set operable to decode or decompress video data macroblocks according to the MPEG2 video compression standard. In other compression standard environments such as JPEG, MPEG1 or Px64, other encoding devices may suitably be employed as appropriate. The decoder 512 is further coupled to both a context random access memory 514 and an reference frame storage device 516. The reference frame store 516 is configured to enable MPEG2 interframe coding in a manner well-known in the art.

The decoder 512 is operably connected to a video frame buffer 518. The frame buffer 518 includes sufficient memory for at least one frame of video data. The frame buffer 518 is then connected to the display controller 418 of FIG. 3.

In operation, the input buffer 502 receives a bit stream of compressed macroblocks for a plurality of video sequences along with their corresponding macroblock IDs from a depacketizer such as depacketizer 506 from FIG. 4. The plurality of video sequences emanate from one or more video transmission nodes, such as work stations 12, 22 and 32 of the video teleconference illustrated in FIG. 1. The video transmission nodes transmit a digital video sequence at any suitable frame rate of 30 frames per second or less. The input buffer 502 provides the compressed macroblocks and their IDs to the RAM-based translation table 504.

The RAM-based translation table 504 converts the incoming macroblock ID to a new macroblock ID that correlates with the window configuration defined by the user. The RAM-based table 504 provides new macroblock block IDs associated with each macroblock's user configured position. The control processor 506 provides updates to the RAM-based table based on changes in the user configuration. The control processor 506 may suitably be any microprocessor and related circuitry. The control processor 506 may provide other timing and control functions inherent to the circuit in FIG. 5, the implementation of which would be readily apparent to one skilled in the art.

The control processor 506 and translation table 504 interact together as follows to effect macroblock translation and elimination. The translation table 504 comprises a memory device with a plurality of accessible addresses. The translation table 504 contains one memory address for each macroblock of each incoming video. According to one embodiment of the present invention, the table's memory locations may suitably be indexed by the incoming macroblock's source or video sequence and macroblock ID. For example, the first macroblock of a frame from the video sequence provided by user A of FIG. 1 corresponds to one memory location while the first macroblock of a frame from the video sequence provided by user C of FIG. 1 corresponds to another location.

When the receiving node user defines a plurality of windows into which one or more video sequences will be displayed, the control processor 506 calculates a translated macroblock position corresponding to each macroblock received. The control processor 506 then writes the new macroblock position data or macroblock ID to each incoming macroblock's table location.

For example, consider the video teleconference of FIG. 1 wherein the three video sequences are displayed in three windows on each of the displays 10, 20 and 30. The macroblocks in each video sequence are defined at the transmission end to be displayed in a standard location, for example, extending to the right and downward from the upper left hand corner of the video screen. The upper left hand corner has a pixel address of (0,0). Because each video sequence is so indexed, the upper left hand corner macroblocks from each of the three video sequences all have a macroblock ID of 0, which is located at pixel address (0,0).

Each user, however, as discussed above in connection with FIG. 1, may define windows in different areas of his or her display. As a result, while a user's first window may start at pixel address (0,0), the second and third may start at (160,80) and (320,160), respectively, extending down and to the right. In general, the macroblock beginning at (160,80)

corresponds to macroblock ID 410 while the macroblock beginning at (320,160) corresponds to macroblock ID 820.

The control processor 506 provides the translation information, in other words, the new macroblock IDs to the RAM-based table 504. The translation table 504 is indexed by each macroblock's video sequence and its macroblock ID as transmitted. According to the example described above, therefore, the control processor 506 would write macroblock ID 0 to the table position corresponding to the first video sequence's macroblock 0, macroblock ID 410 to the table position corresponding to the second video sequence's macroblock 0, and macroblock ID 820 to the table position corresponding to the third video sequence's macroblock 0.

The control processor 506 further provides the macroblock elimination information to the RAM-based translation table 504. In windowing applications, portions of windows may overlap, such as windows $27_1$, $27_2$ and $27_3$ in FIG. 1. The occluded video data need not be displayed or decoded. The control processor 506 determines which macroblocks in which video sequences are occluded and provides this information to the RAM-based translation table 504. In one implementation, the control device 506 may suitably provide a data flag to an occluded macroblock's table address. The data flag signifies that the macroblock is to be eliminated. As a result, when an occluded macroblock accesses its translation table address, the translation table 504 does not provide a macroblock ID but instead an eliminate macroblock flag.

The translation table 504 thereafter provides the compressed macroblock data from the plurality of video sequences to the macroblock data buffer 510. The results of the look-up in the RAM-based translation table 504, in other words, either the new macroblock ID or an eliminate macroblock flag, are provided to the write control signal buffer 508 and the translated address buffer 509. If the results of the look-up produce a valid macroblock ID, then the write control signal buffer 508 provides a write control signal to both the macroblock data buffer 510 and the translated address buffer 509. If the table address contains an eliminate macroblock flag, then no write signal is provided.

If no write signal is provided because the macroblock is occluded, the video data is not written to the macroblock data buffer 510 and contents of the look up table address are not written to the translated address buffer 509. Because neither the macroblock ID nor the macroblock video data are written, the macroblock is effectively eliminated.

If, however, the write control signal buffer 508 provides a write signal, the macroblock video data is written to the data buffer 510. The contents of the macroblock data buffer 510 are thereafter provided to the decoding device 512. Additionally, the contents of the translation table address, in other words, the macroblock ID, are written to the translated address buffer 509. The decoder 512, in conjunction with the context RAM 514 and the reference frame storage device 516, decompresses or decodes the macroblock video data and provides the decoded macroblock data to the frame buffer 518. When the decoded macroblock video data is provided to the frame buffer 518, the translated address buffer provides the new macroblock ID to the frame buffer 518.

The context RAM 514 provides the decoding device 512 with certain parameters external to the macroblocks concerning the macroblock's video sequence. Under most standards, a certain amount of overhead information is associated with each video sequence. For example, the quantization factor used in encoding macroblocks in the particular video sequence is contained within the overhead information. Because the decoding device 512 receives macroblocks originating at a plurality of sources, in other words, in a plurality of video sequences, the overhead information required by the decoding device 512 will change from macroblock to macroblock. The context RAM 514 provides the appropriate context information for the current macroblock being decoded by the decoding device 512. The video sequence context or overhead information is defined by the pertinent compression standard. For example, in the case of MPEG-based systems, see Generic Coding of Moving Pictures and Associated Audio, Recommendation H.262, ISO/IEC 13818-2 (Committee Draft) for a description of required video sequence context information.

The frame buffer 516 stores the macroblock video data at an address corresponding to the new macroblock ID as provided by the translated address buffer 509. In this manner, the decoded video data is placed in a location within the frame buffer 516 that reflects the location of the window within the screen in which it will appear. The frame buffer 516 stores the video data as it is to appear on the video screen of the receiving node user. The frame buffer 516 provides the video data to the display controller 418 of FIG. 3.

In an alternative embodiment of the above circuit 500 modified to be suitable for use with intraframe JPEG coding, the reference frame buffer 516 is eliminated. The JPEG video coding standard employs only intraframe coding. In intraframe coding, the data compression is achieved solely by exploiting spacial correlation within a single frame of a video sequence. As a result, the decoder 512 does not need to access prior (or future) frames of video and can therefore perform the decoding function without the reference frame buffer 516. Moreover, systems employing other video coding standards, such as MPEG standards, can force only intraframe coding, although at a loss of efficiency. Such systems could likewise avoid the need for the reference frame buffer 516.

Another modified embodiment of the circuit 500 described above is suitable for use with motion compensated video signals. Motion compensation is another form of video compression encoding wherein frame video data is obtained from displaced areas of previous or future frames in the sequence, which takes into account the motion of objects within the video image. In motion compensation compression, motion vectors are transmitted which direct the decoder to the location within the reference frame from which the current macroblock has moved. The MPEG2 standard, for example, supports such motion compensation. If motion compensation is utilized, the reference frame buffer 516 would further include standard support circuitry for motion compensation decoding. Such circuitry would be well known to one of ordinary skill in the art.

In addition, however, receiving node work stations containing such an embodiment of the circuit 500 must suppress occlusion and, hence, window overlap. Because motion compensation utilizes the displaced image data from previous or future reference frames, no macroblocks can be occluded or eliminated. Otherwise, the decoder may attempt to reference data for an image that had moved from a hidden macroblock to a visible macroblock. The decoder would incur errors if the motion vector pointed to such a previously occluded macroblock. The work station 12 may in any event be configured, or any other suitable method may be used, to prevent a user from defining overlapping windows. Consequently, this alternative embodiment supports MPEG2 motion compensation but restricts the receiving node user's windowing freedom.

The multipoint encoder circuit illustrated in FIG. 2 and the multipoint decoder illustrated in both FIGS. 3 and 4 are suitable for use in nodes comprising a video teleconferencing system such as the one discussed above in connection with FIG. 1.

Referring again to FIG. 1, one draw back to the network configuration illustrated therein is that to receive video from various sources, each user must establish a virtual circuit connection over the network to the particular resolution of each other participant with whom he desires to establish a video conference. As a consequence, if any of the users A, B or C changes the window size or resolution to be viewed of one of the other participants, a new virtual circuit must be established on the network and the old one terminated. Such ongoing connection and disconnection operations can be time consuming and otherwise inconvenient. To eliminate such problems, alternate configurations may be implemented to provide multiple resolution connections to remote users. A few of such alternative embodiments are discussed in connection with FIGS. 5 and 6 below.

Figure 5:
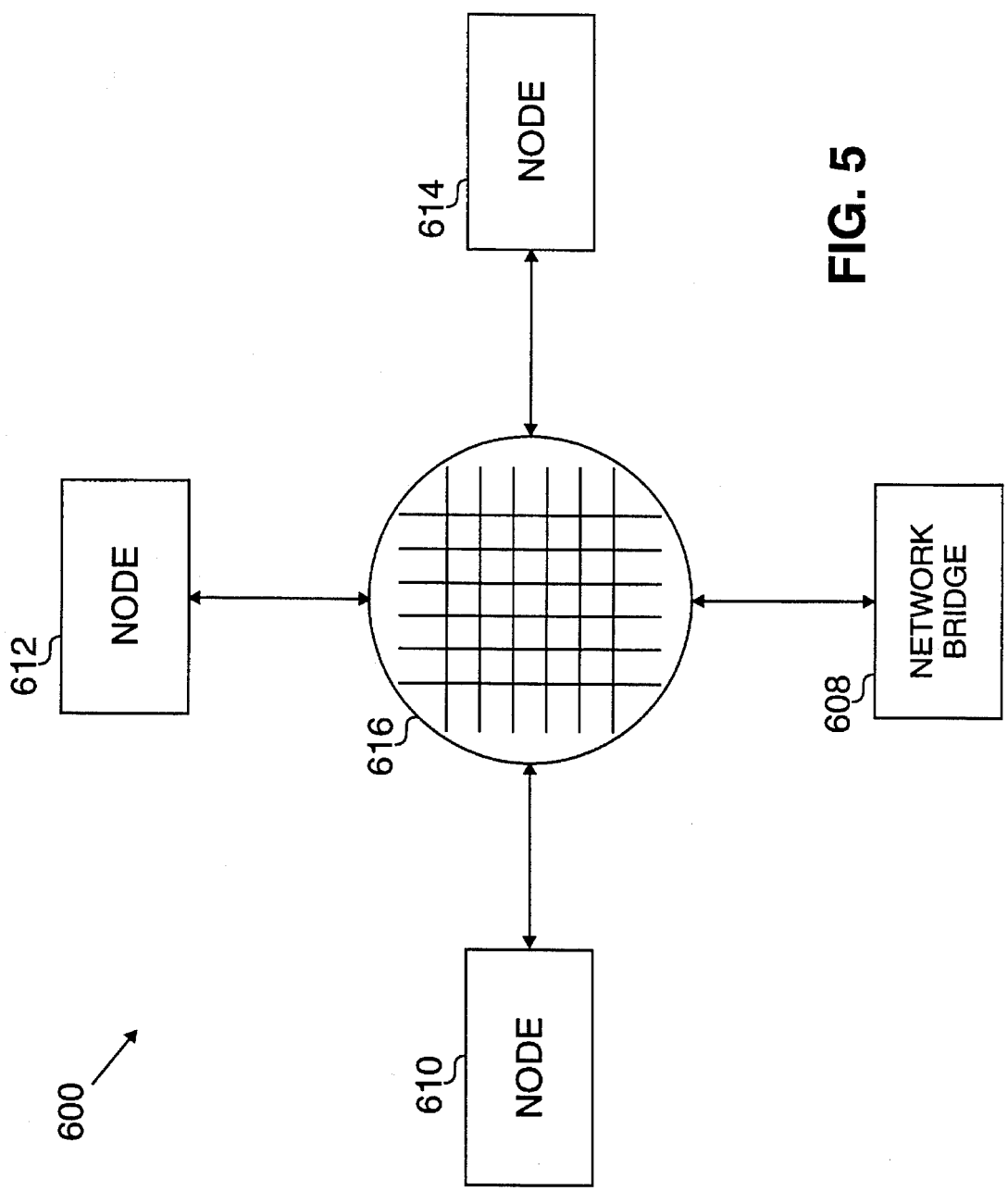
FIG. 5 illustrates an example of a network employing a bridge which may be used in conjunction with at least one encoder and at least one decoder according to the present invention to provide a high efficiency multiple user video teleconferencing system.
Figure 6:
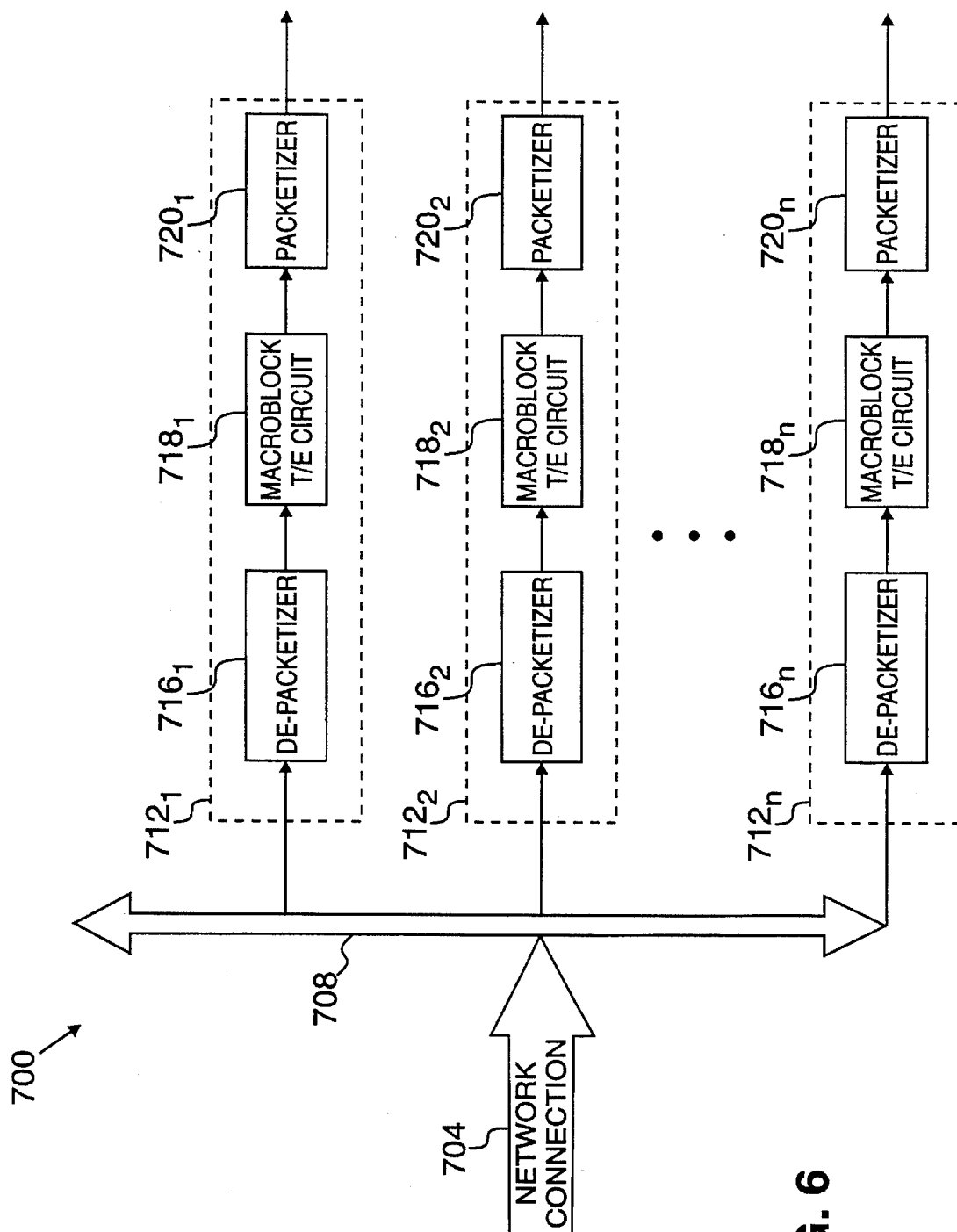
FIG. 6 illustrates an alternative embodiment of a bridge which may be used in conjunction with a system employing at least one encoder and at least one decoder according to the present invention to provide a high efficiency multiple user video teleconferencing .system.

FIG. 5 illustrates an alternative embodiment of a system 600 for providing video teleconferencing service wherein a network bridge 608 is provided to reduce the connection and disconnection requirements of the communication equipment at end-points 610, 612 and 614. The nodes 610, 612, and 614 may represent the work station and display equipment of users A, B and C such as the work stations 12, 22 and 32 illustrated in FIG. 1. The nodes 610, 612 and 614 may operate both as transmission nodes and receiving nodes. Alternatively, one or more of the users may be replaced by a video data storage device of some sort from which the remaining users access video data. The nodes 610, 612 and 614 are connected through the network 616 to a network bridge 608.

The network bridge 608 comprises a dedicated piece of hardware that functions both as a network node and a network switch. The network bridge 608 functions as a node because it establishes virtual circuit connections to the other nodes 610, 612 and 614. The network bridge functions as a switch because it establishes logical connections between the various nodes to which it is connected, as discussed below. The network bridge 608 may suitably comprise an asynchronous transfer mode (ATM) switching circuit, the implementation of which is well known to those of ordinary skill in the art.

In operation, one or more participants in a video conference, for example, users A, B and C at nodes 610, 612 and 614 establish virtual circuit connections to both transmit to and receive from the bridge. Each node provides its video signal to the bridge 608. If any of the nodes 610, 612 and 614 are capable of providing multiple resolution levels, the multiple resolution video sequences are all sent to the network bridge 608. The network bridge 608 then connects the users' transmissions to each node 610, 612 and 614 as requested by each user.

In this manner, each user need not establish a virtual circuit connection with each other participant over the network 616. Furthermore, if one of the users desires to change the display window size, and hence resolution, of one of the participants, the user does not need to disconnect one virtual circuit with the participant and establish another. Instead, the bridge merely connects the user to the video sequence of the appropriate resolution level. By eliminating the connection/disconnection requirements of the nodes the hardware cost can be reduced and the implementation simplified.

FIG. 6 illustrates an alternative embodiment of a bridge which may be used in place of the standard ATM switch discussed above in connection with FIG. 6. The bridge 700 includes a multicast bus 708 which is capable of establishing a plurality of virtual circuits to several nodes connected over a network connection 704. The multicast bus 708 comprises a data bus that can receive data from several sources. The multicast bus 708 is coupled to a plurality of logical bridge circuits $712_1 \ldots 712_n$. Each logical bridge circuit $712_1 \ldots 712_n$ is capable of establishing one virtual circuit output connection to a receiving node, not shown. As a result, a particular bridge 700 having logical bridge circuits $712_1 \ldots 712_n$ can provide video signals to up to n nodes.

The first logical bridge circuit $712_1$ is described below in detail. The remaining logical bridge circuits $712_2 \ldots 712_n$ contain the same elements as the first circuit $712_1$ and perform the same relative functions. The first circuit $712_1$ includes a depacketizer $716_1$ connected to the multicast bus 708. The depacketizer $716_1$ comprises the circuitry required to convert network video data packets into streams of compressed video macroblocks.

The depacketizer $716_1$ is connected to a macroblock T/E circuit $718_1$ which may suitably comprise a circuit similar to the T/E circuit 410 from FIG. 3 above. The T/E circuit $718_1$ is connected to a packetizer $720_1$. The packetizer $720_1$ provides packets of video data to the virtual circuit connection to the logical bridge circuit $712_1$.

In operation, the bridge 700 operates as follows. Consider three node users A, B and C initiating and participating in a video teleconference located at nodes 610, 612 and 614 in FIG. 6. One or more of the users A, B and C provides a plurality of video sequences corresponding to a plurality of resolution levels by establishing virtual circuit connections to the multicast bus 708. Each user A, B and C further establishes a virtual circuit to one of the logical bridge circuits $712_1, \ldots 712_n$ to receive video data therefrom. Thus, user A could be connected to $712_1$, user B connected to $712_2$, and user C connected to $712_3$.

When each user is connected, each user provides one or more multiple resolution video sequences to the multicast bus 708. Logical circuits $712_1$, $712_2$ and $712_3$ each receive video data for all the video sequences provided by each participant. The depacketizer $716_1$, $716_2$ and $716_3$ provide all this video data to their respective T/E devices $718_1$, $718_2$ and $718_3$.

The T/E devices $718_1$, $718_2$ and $718_3$ controllably eliminate macroblocks from the data stream in order to provide only the macroblocks that correspond to the particular user's window definition. For example, if user A selects a full screen of B's video overlapped by 1/16 screens of A's and C's video, The T/E device $718_1$ eliminates macroblocks from the video sequences containing all other resolution levels of A's video, B's video, and C's video. Moreover, the T/E device $718_1$ also eliminates macroblocks form B's full screen video sequence which are hidden by A's window and B's window.

The T/E circuit $718_1$ also translates the macroblock's screen location to conform to user A's window placement. In fact, the T/E circuits $718_1$, $718_2$ and $718_3$ operate in much the same manner as the T/E circuit 410 in FIG. 4 above, the only difference being that the T/E circuits $718_1$, $718_2$ and $718_3$ receive the video sequences containing all the resolution streams from each participant and therefore must eliminate more video data. In addition, each user must provide control signals defining a desired window configuration to the user's assigned logical bridge.

The bridge circuit 700 provides advantages over the simpler ATM switching circuit 608 of FIG. 5. Because the macroblock elimination function is performed by the bridge, less data is required to be transmitted to the receiving nodes. This reduction in transmitted data reduces the bandwidth required. Furthermore, because the T/E circuit function is performed at the bridge, receiving nodes need not possess such circuitry. Hardware costs are thereby reduced.

Another alternative bridge consists of a bridge similar to the bridge 700 with the exception that it consists of only one logical bridge circuit $712_1$. In such a case, the logical bridge circuit $712_1$ establishes a virtual connection with all the transmitting nodes and all the receiving nodes. No multicast bus 708 is required. The logical bridge circuit $712_1$ receives all the resolution level signals from all of the transmission nodes, not shown, through the network connection 714. The logical bridge circuit $712_1$ thereafter performs the same function as discussed above, including performing the macroblock elimination and translation steps. The logical bridge $712_1$ then transmits the resulting video signal to all the receiving nodes.

Because only one logical circuit is provided, only one window configuration will be available to all users. While this limits the flexibility of the windows environment, it reduces the hardware required by the network bridge 700.

Although the foregoing examples illustrate video teleconferencing applications, the method of the present invention may readily be applied to other multipoint video environments. The use of multipoint encoding and decoding technology according to the present invention enables any video telecommunications application to use a multiple windows environment, including interactive multiparty video games. Furthermore, the multiple windows video environment may be achieved relatively inexpensively because it requires a minimum of additional encoding and decoding hardware.

In alternative implementations, one or more of the work stations 12, 22 or 32 of FIG. 1 may comprise a central video data base, a video chalk board, or even a cable television service provider, depending on the implementation. In many cases, such work stations need not always operated as a receiving node and may simply connect with consumer receiving nodes to provide video information thereto according to the methods of the present invention.

It is to be understood that the use of a three node system is also given by way of example only. Any number of transmitting nodes, whether or not employing the multipoint encoder circuit of the present invention can provide video data to any number of receiving nodes employing the multipoint decoder circuit of the present invention described in connection with FIGS. 3 and 4 above. Conversely, any number of receiving nodes, whether or not employing the multipoint decoder circuit of the present invention, can receive video data from one or more transmitting nodes employing the multipoint encoder circuit 200 of FIG. 2.

Details such as the use of NTSC signals, a 640×480 pixel digital display, and specific subsampling rates and methods are naturally given by way of example only. Other standard video signals and/or other digital display arrangements may readily be implemented in the present invention by one of ordinary skill in the art.

We claim:

1. A multipoint video communication system operable to support multiple window video environment, the system comprising:

a) a plurality of video transmission nodes, at least one of which includes a multipoint encoder circuit, the multipoint encoder circuit comprising
a source of digital video data;
means for generating digital video data comprising a plurality of resolution levels from a video signal connected to the source of video data; and
an encoding device;

b) one or more video receiving nodes for receiving video data comprising a plurality of video sequences from a plurality of video transmission nodes, each video sequence comprising macroblocks of video data and further including distinct context information, the receiving node comprising
a decoder circuit operable to decode received macroblocks of video data;
means for providing to the decoder circuit context information corresponding to the video sequence of which each macroblock is part;
a display controller connected to the decoder circuit for driving a video display device; and c) means for controllably connecting the plurality of video transmission nodes to one or more video receiving nodes.

2. The multipoint video communication system of claim 1 wherein one or more of the video transmission nodes is also a video receiving node.

3. The multipoint video communication system of claim 1 wherein a plurality of the video transmission nodes are also video receiving nodes.

4. The multipoint video communication system of claim 1 wherein the connecting means comprises an asynchronous transfer mode switching circuit.

5. The multipoint video communication system of claim 1 wherein the connecting means includes:

a logical bridge circuit including a macroblock translation means; and a data network connecting the logical bridge circuit to the plurality of transmission nodes and further connecting the logical bridge circuit to the one or more receiving nodes.

6. The multipoint video communication system of claim 1 wherein the receiving node further comprises macroblock translation means connected to the decoder circuit.

7. The multipoint video communication system of claim 6 wherein the receiving node further comprises macroblock elimination means connected to the decoder circuit.

8. The multipoint video communication system of claim 1 wherein the connecting means comprises:

a multicast bus for receiving video data from the plurality of transmission nodes;

one or more logical bridge circuits connected to the multicast bus; and a communication network connecting the multicast bus to the plurality of transmission nodes, the network further connecting the one or more logical bridge circuits to the one or more receiving nodes.

9. The multipoint video communication system of claim 8 wherein the one or more logical bridge circuits include a macroblock translation means.

10. The multipoint video communication system of claim 9 wherein the one or more logical bridge circuits include a macroblock elimination means.

11. A multipoint decoder circuit operable to receive compressed video data corresponding to a plurality of video sequences to be displayed simultaneously in a windows format, each of the plurality of video sequences including context information, said context switchable decoder comprising:

input means for receiving video data corresponding to a plurality of video sequences;

a decoding means for decompressing the received video data; and means for providing video context information to the decoding means, the context information contained in the video sequence corresponding to the video data being decoded.

12. The multipoint decoder circuit of claim 11 wherein the decoding means is operable to decode video data encoded using intraframe video data compression techniques.

13. The multipoint decoder circuit of claim 11 wherein the decoding means is operable to decode video data encoded using interframe video data compression techniques.

14. The multipoint decoder circuit of claim 11 wherein the decoding means is operable to decode video data encoded using motion compensation video data compression techniques.

15. The multipoint decoder circuit of claim 11 further comprising means for directing the incoming plurality of video sequences to a plurality of user-defined windows.

16. The multipoint decoder circuit of claim 11 wherein the means for providing video context information comprises a random access memory device.

17. A video display system operable to receive packets of compressed video data, composed of frames, to be displayed in a windows environment, said video display system comprising:

a depacketizer operable to receive packets of compressed video data corresponding to a plurality of video sequences and further operable to produce a stream of compressed video data corresponding to the plurality of video sequences, each video sequence comprising a plurality of frames, each frame comprising a plurality of macroblocks, the macroblocks including a macroblock identifier representative of the macroblock's location within the a frame of a video sequence;

a macroblock eliminator connected to the depacketizer, said macroblock eliminator including means for eliminating video data corresponding to hidden portions of the plurality of video sequences;

a macroblock translation means connected to the macroblock eliminator for translating the macroblock identifier into a new macroblock identifier representative of the macroblock's location within the display corresponding to a user-defined windows configuration; and a context switchable decoding means connected to the macroblock eliminator, said context switchable decoding including means for decompressing the video data.

18. The video display system of claim 17 wherein the macroblock eliminator comprises a RAM-based look up table.

19. The video display system of claim 17 wherein the macroblock eliminator includes:

a) a RAM-based look up table; and b) a video data buffer.

20. The video display system of claim 17 wherein the macroblock translation means comprises a RAM-based look up table.

21. The video display system of claim 17 wherein the macroblock translation means and the macroblock eliminator comprise one RAM-based look up table.

22. The video display system of claim 17 wherein the context switchable decoder comprises:

a) a decoding device; and b) a context random access memory coupled to the decoding device to transfer video context information there between.

23. The video display system of claim 22 wherein the decoding device is a JPEG standard compatible decoding device.

24. The video display system of claim 22 wherein the decoding device is an MPEG1 standard compatible decoding device.

25. The video display system of claim 22 wherein the decoding device is an MPEG2 standard compatible decoding device.

26. The video display system of claim 22 wherein the context switchable decoder further comprises an reference frame buffer coupled to the coding device.

27. A multipoint video encoder circuit operable to produce compressed video data corresponding to a plurality of video sequences, each video sequence representing a different resolution level of one original video sequence, the multipoint video encoder circuit comprising:

a source of digital video data constituting the original video sequence;

means for filtering a digital signal connected to the source of digital video data;

means for sub-sampling a digital signal connected to the digital signal filtering means;

an encoding device; and means for preparing packets of encoded video data for transmission.

28. A multipoint video encoder circuit operable to produce compressed video data corresponding to a plurality of video sequences, each video sequence representing a different resolution level of one original video sequence, the multipoint video encoder circuit comprising:

a source of digital video data constituting the original video sequence;

a first anti-aliasing filter connected to the source of video data;

a first write controllable strip memory coupled to the first anti-aliasing filter;

a second write controllable strip memory coupled to the source of video data;

an encoding device; and means for preparing packets of encoded video data for transmission.

29. The multipoint video encoder circuit of claim 28 further comprising:

a second anti-aliasing filter connected to the first anti-aliasing filter; and a third write controllable strip memory connected to the second anti-aliasing filter.

30. A method of receiving video data corresponding to a plurality of video sequences, each video sequence comprising a plurality macroblocks and further comprising distinct context information, the video sequences to be displayed simultaneously in a windows format, the method comprising:

a) receiving video data corresponding to a plurality of video sequences;

b) employing a decoding device to decode one of the plurality of macroblocks from one of the plurality of sequences within the received video data;

c) providing the decoder with context information that corresponds to the video sequence of which the macroblock being decoded is part; and d) repeating steps b) and c) for a plurality of macroblocks; and e) displaying the plurality of decoded macroblocks on a display device.

31. The method of claim 30 wherein the received video data comprises data encoded according to the Px64 encoding standard.

32. The method of claim 30 further comprising the step of providing position information representative of the position in which a macroblock will appear on the display device relative to other macroblocks which make up the plurality of images in the received video data.

33. The method of claim 30 further comprising the step of eliminating macroblocks corresponding to portions of the plurality of images which are overlapped or hidden on the display device employing a windows format.

34. The method of claim 30 wherein the received video data comprises interframe encoded video data.

35. The method of claim 34 wherein the interframe encoded video data is encoded according to the MPEG1 video standard.

36. The method of claim 34 wherein the interframe encoded video data is encoded according to the MPEG2 video encoding standard.

* * * * *